(12) United States Patent
Kowal et al.

(10) Patent No.: US 7,399,036 B2
(45) Date of Patent: Jul. 15, 2008

(54) MOLDED PLASTIC UNIVERSAL SEAT

(75) Inventors: Eric D. Kowal, Macomb, MI (US); Arthur Vermolen, La Nucia (ES)

(73) Assignee: SABIC Innovative Plastics IP B.V., Pittsfield, MA (US)

( * ) Notice: Subject to any disclaimer, the term of this patent is extended or adjusted under 35 U.S.C. 154(b) by 80 days.

(21) Appl. No.: 11/565,674

(22) Filed: Dec. 1, 2006

(65) Prior Publication Data

US 2008/0129097 A1 Jun. 5, 2008

(51) Int. Cl.
*A47C 7/00* (2006.01)
(52) U.S. Cl. .......................... 297/440.16; 297/440.21; 297/440.22; 297/452.65; 297/DIG. 2
(58) Field of Classification Search ............ 297/452.65, 297/440.15, 440.16, 440.2, 440.21, 440.22, 297/DIG. 2, 440.24
See application file for complete search history.

(56) References Cited

U.S. PATENT DOCUMENTS

| | | | |
|---|---|---|---|
| 3,111,344 A * | 11/1963 | Hoven et al. ........... | 297/452.65 |
| 4,368,917 A | 1/1983 | Urai | |
| 4,725,095 A | 2/1988 | Benson et al. | |
| 4,746,168 A * | 5/1988 | Bracesco ................ | 297/440.2 |
| 5,253,924 A | 10/1993 | Glance | |
| 5,575,533 A | 11/1996 | Glance | |
| 5,735,572 A | 4/1998 | Clark et al. | |
| 5,823,620 A | 10/1998 | Le Caz | |
| 5,826,944 A * | 10/1998 | Beneker et al. .......... | 297/440.2 |
| 5,895,096 A | 4/1999 | Massara | |
| 6,059,369 A | 5/2000 | Bateson et al. | |
| 6,267,426 B1 | 7/2001 | Seibold | |
| 6,346,325 B1 | 2/2002 | Edwards et al. | |
| 6,488,339 B1 * | 12/2002 | Finner et al. ........... | 297/440.16 |
| 6,616,223 B1 | 9/2003 | Lin | |
| 6,739,671 B2 * | 5/2004 | De Maina ............... | 297/440.1 |
| 6,811,195 B2 | 11/2004 | Klocke et al. | |
| 6,817,673 B2 | 11/2004 | Walker et al. | |
| 6,824,860 B2 | 11/2004 | Edwards et al. | |
| 2004/0194281 A1 | 10/2004 | Endemann et al. | |

(Continued)

FOREIGN PATENT DOCUMENTS

WO WO9819879 5/1998

OTHER PUBLICATIONS

International Search Report for PCT/US2007/075883 International Filing Date Aug. 14, 2007, Mailing Date Dec. 18, 2007 (5 Pages).

(Continued)

*Primary Examiner*—Anthony D. Barfield

(57) ABSTRACT

A molded seat that is formed from plastic and has improved strength and attachment mechanisms. The seat includes a seat back and a seat pan, both of which are constructed from a plastic material. The universal seat also includes an articulated recliner that is connected to both the seat back and the seat pan. The articulated recliner includes high-strength sheath portions into which plastic bayonets from the seat pan and the seat back are inserted. The use of the articulated recliner results in a seat having improved strength. In addition, the combination of the sheaths of the articulated recliner in conjunction with the bayonets of the seat back and seat pan help eliminate the need for additional attachment mechanisms, thereby making the universal seat easier to manufacture and install.

14 Claims, 4 Drawing Sheets

U.S. PATENT DOCUMENTS

2005/0010690 A1 1/2005 Marshall et al.
2005/0046235 A1 3/2005 Robertson et al.
2005/0179290 A1 8/2005 Hancock et al.
2006/0113756 A1 6/2006 Tracht

OTHER PUBLICATIONS

Written Opinion of the International Searching Authority for PCT/US2007/075883 International Filing Date Aug. 14, 2007, Mailing Date Dec. 18, 2007 (7 Pages).

* cited by examiner

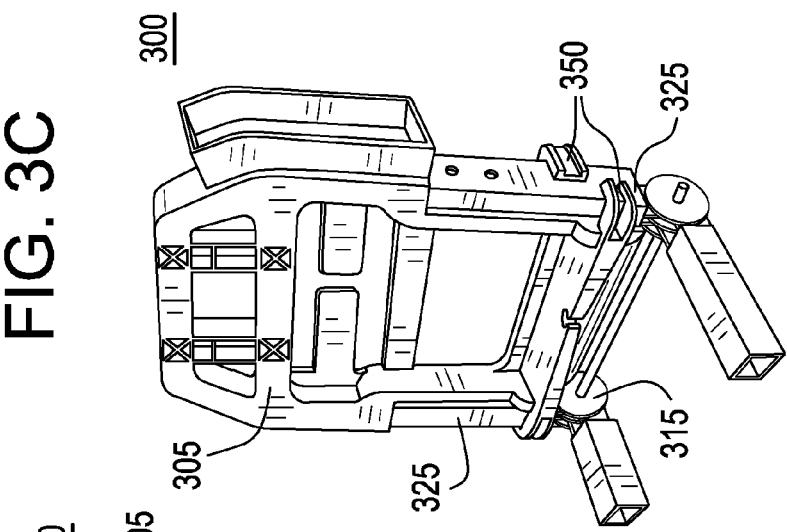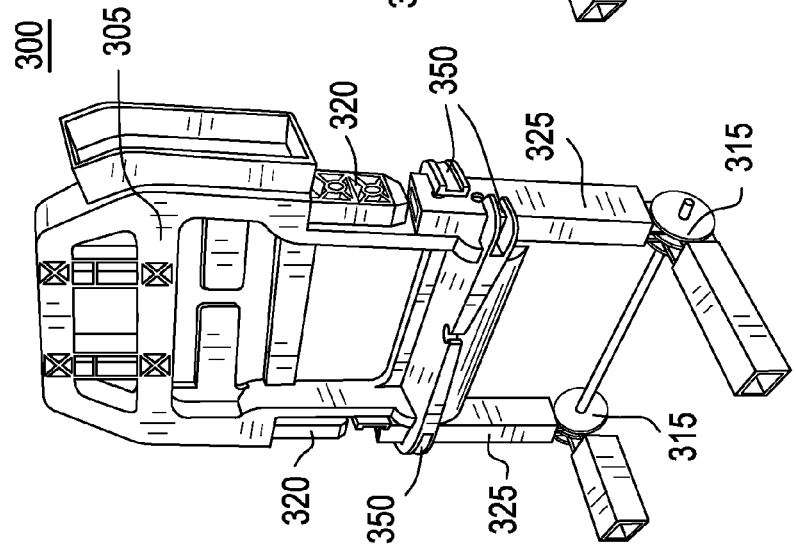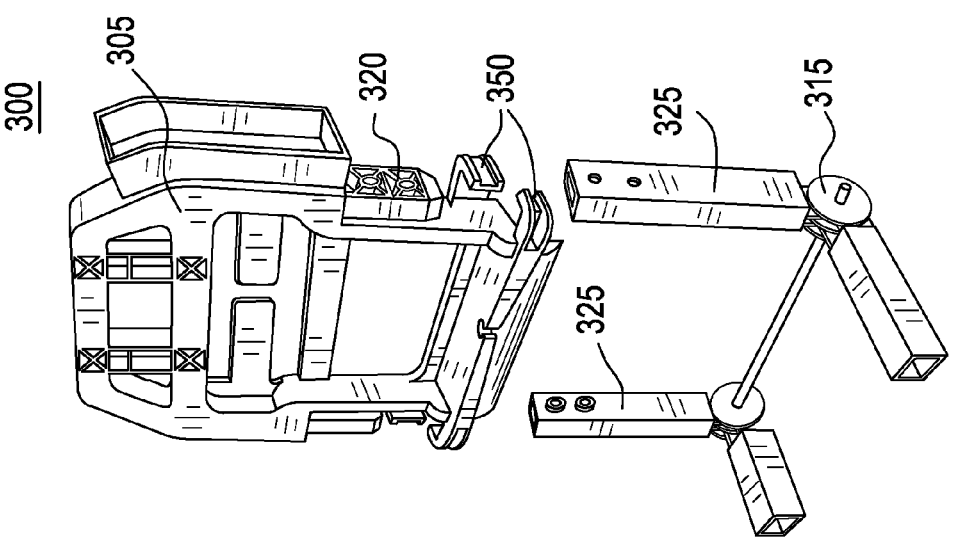

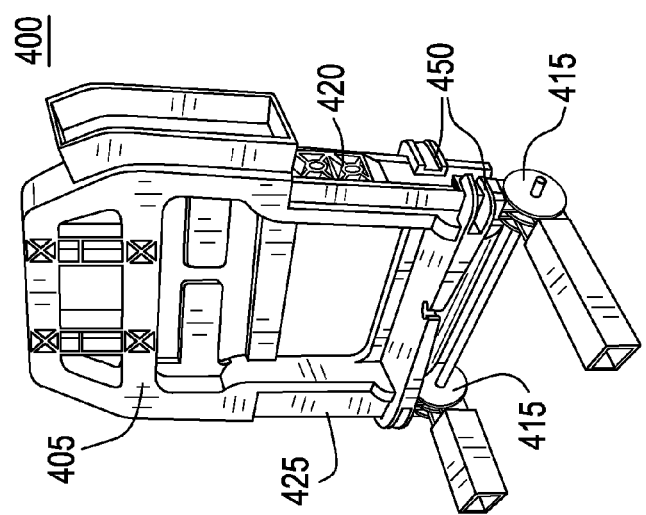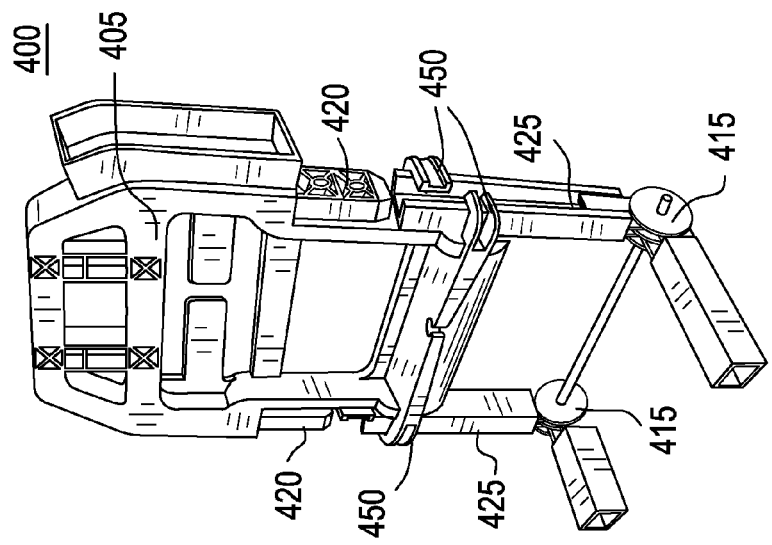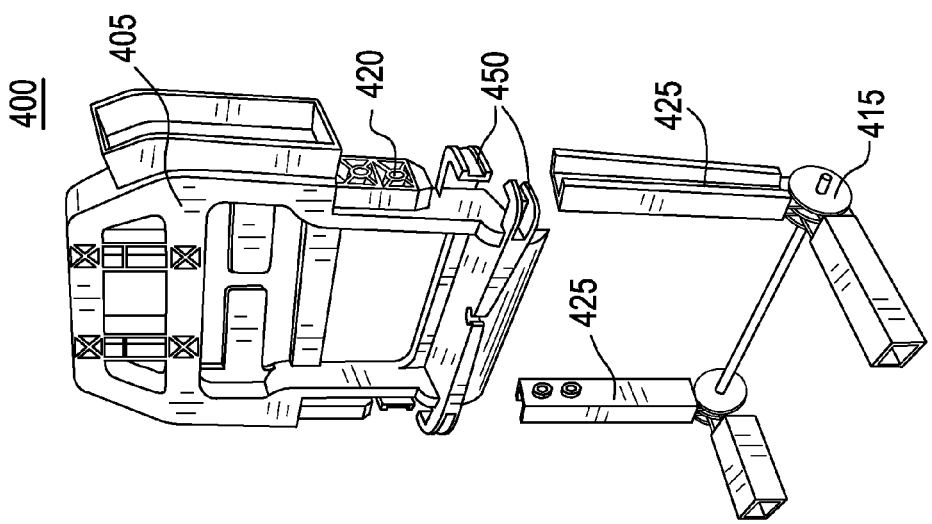

MOLDED PLASTIC UNIVERSAL SEAT

FIELD OF INVENTION

The present invention relates to motor vehicle seats and, in particular, to molded motor vehicle seats having improved strength and attachment mechanisms.

BACKGROUND OF INVENTION

Blow-molded seats are presently used in a significant number of vehicles, especially for rear seats in many vehicles. These blow-molded seats include seat backs and seat pans that are formed from plastic materials using a blow molding process. Unfortunately, these blow-molded seats include relatively weak components that are not capable of withstanding loads generated when a seat belt is required, such as through rapid deceleration and/or an accident. As such, during these seat belt loads, the blow-molded seats may fail at the connections of the seat back and/or seat pan to the motor vehicle.

The prior art has attempted to rectify these issues through the use of reinforced blow-molded seats. In one embodiment, the reinforced blow-molded seats include a front, low back, bucket seat that utilizes a blow molded seat back frame reinforced with a vertical beam at one side to carry seat belt loads produced during rapid deceleration and/or an accident.

In another embodiment, blow molded seat frames having high strength, roll-formed metal tubes are used. These tubes permit the creation of belt carrying lower seat cushion frames, full bench frames, split bench frames, and high back captain's chairs. In this embodiment, the seat backs and/or seat pans may be attached to an articulated recliner using a hollow sheath in the seat back/seat pan into which the articulated recliner is inserted.

Nevertheless, these embodiments, while providing increased support during seat belt loads, still do not provide optimum strength. In addition, the seats constructed according to the prior art require additional mechanisms for connecting the seat to the vehicle, thereby making the seats more difficult to manufacture and/or install.

SUMMARY OF THE INVENTION

The present invention provides a universal seat that is formed from lightweight materials and has improved strength and attachment mechanisms as compared to prior art seats. The universal seat includes a seat back and a seat pan, both of which are constructed from a thermoplastic material. The universal seat also includes an articulated recliner that is connected to both the seat back and the seat pan. The articulated recliner includes high-strength sheath portions into which one or more plastic bayonets from the seat pan and the seat back are inserted. The use of the high strength sheaths results in a seat having improved strength. In addition, the combination of the sheaths of the articulated recliner in conjunction with the bayonets of the seat back and seat pan help eliminate the need for additional attachment mechanisms, thereby making the universal seat easier to manufacture and install.

Accordingly, in one aspect, the present invention provides a universal seat including a seat back having at least one bayonet, a seat pan having at least one bayonet, and an articulated recliner having at least two sheaths. The at least one seat back bayonet is inserted into one sheath of the articulated recliner and the at least one seat pan bayonet is inserted into the other sheath of the articulated recliner. In addition, the seat back and the seat pan each comprise a thermoplastic material.

In another aspect, the present invention provides a method of forming a universal seat including the steps of molding a seat back having at least one bayonet using a first thermoplastic material, molding a seat pan having at least one bayonet using a second thermoplastic material, inserting the at least one bayonet of the seat back into a first sheath of an articulated recliner, and inserting the at least one bayonet of the seat pan into a second sheath of the articulated recliner.

BRIEF DESCRIPTION OF THE DRAWINGS

FIGS. 3A-3C provide an exploded view, a semi-exploded view and a perspective view of a seat back according to another alternative embodiment of a universal seat according to the present invention.

FIGS. 4A-4C provide an exploded view, a semi-exploded view and a perspective view of a seat back according to yet another alternative embodiment with open channel sheaths of a universal seat according to the present invention.

DETAILED DESCRIPTION OF THE INVENTION

Figure 1:
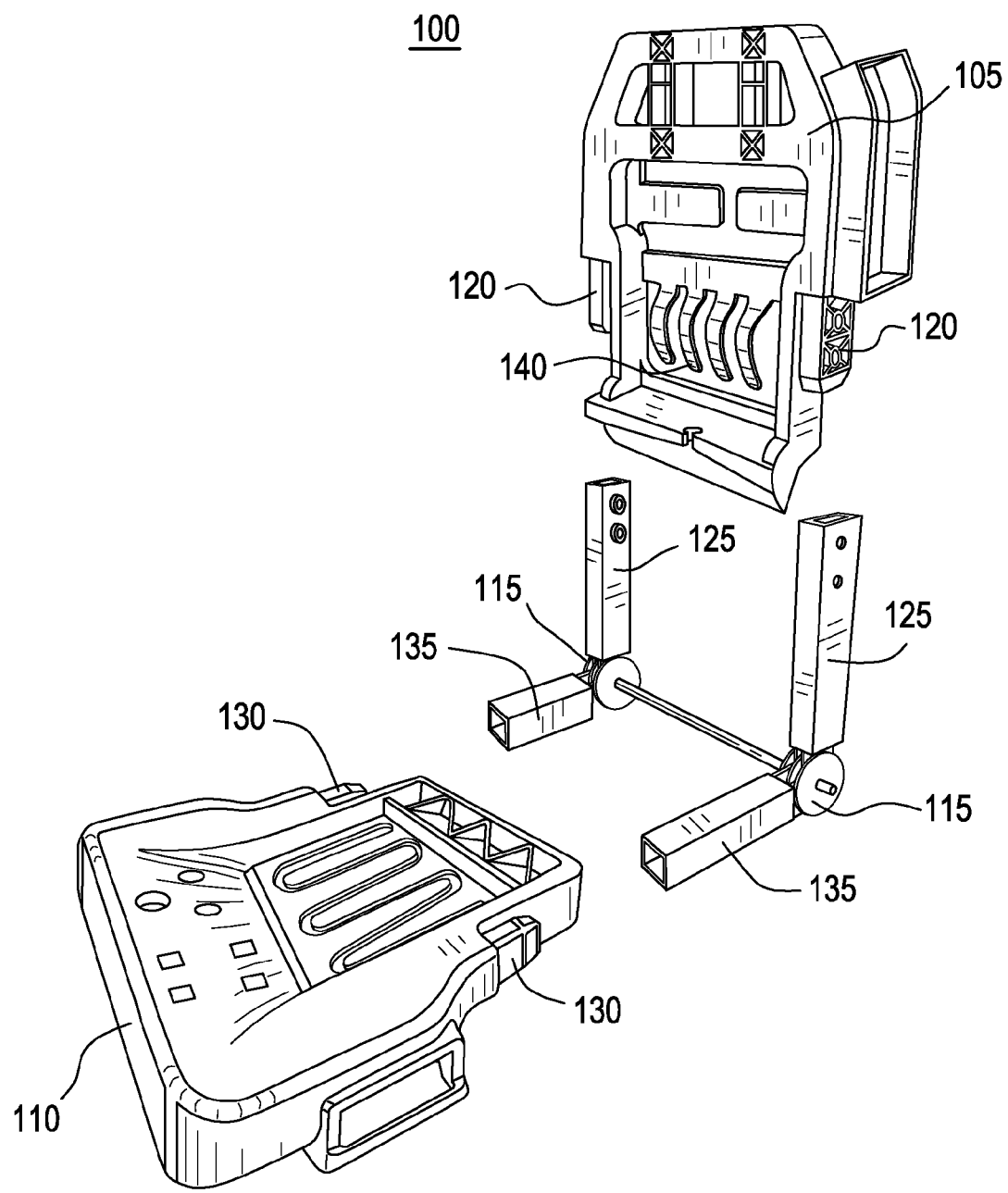
FIG. 1 is an exploded view of one embodiment of a universal seat according to the present invention.

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The present invention provides a universal molded seat. The seat utilizes plastic materials for lightweight construction while also providing an enhanced connection mechanism that provides increased strength to the universal seat while enabling the seat to be more quickly and efficiently manufactured. The universal seat includes a seat back and a seat pan, both constructed from a thermoplastic material. The universal seat also includes an articulated recliner designed to connect to the seat back and the seat pan in a manner that increases the structural strength of the universal seat as compared to prior art seats while also requiring fewer attachment mechanisms than prior art seats, thereby enabling the universal seats of the present invention to be more quickly and efficiently manufactured and/or installed into a motor vehicle.

Accordingly, in one aspect, the present invention includes a seat back. The seat back is designed to provide back support to an individual sitting in the universal seat. The seat back may be a solid piece, or it may include one or more openings. In an alternative embodiment, the seat back may include a lumbar support portion.

In one embodiment, the seat back is constructed from a thermoplastic material. The use of a thermoplastic material enables the seat back to be formed using a molding process. The seat back may be constructed from any thermoplastic material capable of being molded. Examples of thermoplastic materials that may be used in the seat back include, but are not limited to, polycarbonate (LEXAN® and LEXAN® EXL resins commercially available from General Electric Company), polycarbonate/ABS blends, (CYCOLOY® resins commercially available from General Electric Company) glass filled blends of polyphenylene oxide and polystyrene, blends of polyphenylene ether/polyamide (NORYL GTX® resins from General Electric Company), blends of polycarbonate/polyethylene terephthalate (PET)/polybutylene terephthalate (PBT), PBT and impact modifier (XENOY® resins commercially available from General Electric Company), long fiber reinforced thermoplastics (VERTON® resins commercially available from General Electric Company), or a combination including at least one of the foregoing thermoplastic materials.

The seat back also includes at least one bayonet structure. The bayonet is designed to fit into a sheath portion of an articulated recliner to enable connection of the seat back with the articulated recliner. In one embodiment, the seat back may include a single bayonet structure located on a bottom side of the seat back. In an alternative embodiment, the seat back may include two or more bayonets located on one or more sides of the seat back. The bayonet structures may be solid or they may be hollow, although in select embodiments of the present invention, the bayonet structures are solid, thereby enabling the bayonet structure to provide even better strength to the universal seat. By using a solid bayonet structure as compared to the hollow sheath structures of prior art seats there is greater strength in the seat back to absorb forces since the sheath of the articulated recliner is constructed from a material having greater structural strength than a thermoplastic material.

In addition, in alternative embodiments, the bayonets may be shaped such that the cross-sectional area of the bayonet gradually increases from the tip of the bayonet to the hilt where the bayonet connects to the seat back. As such, when the bayonet is inserted into the articulated recliner, a frictional engagement may be created when the cross-sectional area of the bayonet becomes greater than the cross-sectional area of the articulated recliner. The frictional engagement enables the seat back to be connected to the articulated recliner without the need of any additional connection mechanisms, such as bolts, screws, nails, or the like, thereby enabling the universal seat of the present invention to be more quickly and efficiently manufactured. However, it is to be understood that, in an alternative embodiment, a connection mechanism may also be utilized for connecting the seat back to the articulated recliner.

The seat back may be designed such that the seat back can be formed in a single-piece construction, although in alternative embodiments, two-piece constructions may also be possible. In a single-piece embodiment, a molding process may be used to form the single piece. Accordingly, the seat back can be designed based on one or more design factors and then formed using a selected molding process. Examples of design factors that may be used include, but are not limited to, the selected shape of the seat back, the presence of any lumbar support, the number and location of the bayonets, and/or whether the bayonets will be hollow, solid or substantially solid.

In a two-piece embodiment, the seat back may be designed such that the seat back is formed in two halves, such as a front half and a back half, and then attached to one another, such as with an adhesive or with a welding process. Alternatively, in those embodiments wherein a lumbar support is included, the lumbar support may be formed separate from the remainder of the seat back and then attached thereto, such as with an adhesive or with a welding process.

The seat back may be formed using any molding process capable of forming a one-piece or two-piece seat back. Examples of molding process that may be used to form the seat back include, but are not limited to, injection molding, injection/compression molding, compression molding, blow molding, thermoforming, hand lay-up or the like.

In addition to the seat back, the universal seats of the present invention also include a seat pan. The seat pan is designed to provide lower support to an individual sitting in the universal seat. As with the seat back, the seat pan may be a solid piece, or it may include one or more openings.

In one embodiment, the seat pan is constructed from a thermoplastic material. The use of a thermoplastic material enables the seat pan to also be formed using a molding process. The seat pan may be constructed from any thermoplastic material capable of being molded. Examples of thermoplastic materials that may be used in the seat pan include, but are not limited to polycarbonate, polycarbonate/ABS blends, blends of polycarbonate/polyethylene terephthalate (PET)/polybutylene terephthalate (PBT) and impact modifier, or a combination including at least one of the foregoing thermoplastic materials. In one embodiment, the seat pan is constructed from a polycarbonate/polybutylene terephthalate alloy with an impact modifier. Also, in one embodiment, the seat back and the seat pan are constructed from the same thermoplastic material. In an alternative embodiment, the seat back and the seat pan are constructed from different thermoplastic materials.

As with the seat back, the seat pan also includes at least one bayonet structure. The bayonet is designed to fit into a sheath portion of the articulated recliner to enable connection of the seat pan with the articulated recliner. In one embodiment, the seat pan may include a single bayonet structure located on a top or rear side of the seat pan. In an alternative embodiment, the seat pan may include two or more bayonets located on one or more sides of the seat pan. The bayonet structures may be solid or they may be hollow, although in select embodiments of the present invention, the bayonet structures are solid, thereby enabling the bayonet structure to provide even better strength to the universal seat. As previously discussed, by using a solid bayonet structure as compared to the hollow sheath structures of prior art seats, there is greater strength in the seat pan to absorb forces since the sheath of the articulated recliner is constructed from a material having greater structural strength than a thermoplastic sheath material.

In addition, in alternative embodiments, the bayonets may be shaped such that the cross-sectional area of the bayonet gradually increases from the tip of the bayonet to the hilt of the bayonet that connects to the seat pan. As such, when the bayonet is inserted into the articulated recliner, a frictional engagement may be created when the cross-sectional area of the bayonet becomes greater than the cross-sectional area of the articulated recliner. The frictional engagement enables the seat pan to be connected to the articulated recliner without the need of any additional connection mechanisms, such as bolts, screws, nails, or the like, thereby enabling the universal seat of the present invention to be more quickly and efficiently manufactured. However, it is to be understood that, in an alternative embodiment, a connection mechanism may also be utilized for connecting the seat pan to the articulated recliner.

As with the seat back, the seat pan may be designed such that the seat pan is capable of being formed in a single-piece construction, although in alternative embodiments, two-piece constructions may also be possible. In a single-piece embodiment, a molding process may be used to form the single piece. Accordingly, the seat pan can be designed based on one or more of the design factors previously discussed and then formed using a selected molding process.

In a two-piece embodiment, the seat pan may be designed such that the seat pan is formed in two halves, such as a front half and a back half, and then attached to one another, such as with an adhesive or with a welding process.

The seat pan may be formed using any molding process capable of forming a one-piece or two-piece seat pan. Examples of molding process that may be used to form the seat pan include, but are not limited to, injection molding, injection/compression molding, compression molding, blow molding, thermoforming, or the like.

In addition to the seat back and the seat pan, the universal seats of the present invention also include an articulated recliner. As used herein, an "articulated recliner" is a section that includes at least two segments jointed to one another that permit the universal seat to be reclined. The joints form a structural member where one joint supports the seat pan and, in one embodiment, is fastened to the vehicle floor. In one embodiment this joint can be mounted in a rail that allows fore/aft adjustment of the seat in-vehicle. In another embodiment, the segment is fixed directly to the vehicle floor. The other segment supports the seat back. As such, in one embodiment, the articulated recliner includes two sheath portions connected at a joint. In one embodiment, the joint is stationary. In an alternative embodiment, the joint pivots, thereby permitting the seat back to be folded towards to the seat pan or vice versa.

As previously discussed, the articulated recliner includes two sheath portions that are designed to mate with respective bayonet sections of the seat pan and the seat back. As such, a bayonet from the seat back is inserted into one sheath portion of the articulated recliner and a bayonet from the seat pan is inserted into the other sheath portion of the articulated recliner thereby forming the universal seat.

The shape of the sheaths is dependent on the shape of the bayonets. If a bayonet is used that has a rectangular cross-section, then the corresponding sheath portion should also have a rectangular cross-section. Conversely, if the bayonet has a circular cross-section, then the corresponding sheath portion should also have a circular cross-section. It is to be understood that other geometries of bayonet and sheath may also be used including, but not limited to, oval, square, triangular, trapezoidal, and the like. Also, in embodiments wherein multiple bayonets are used, the bayonets/sheaths may have the same or different cross-sections. Also, while it is understood that a sheath may be used having a different cross-sectional shape as the bayonet, these embodiments may not provide the same level of strength as sheath/bayonets having the same cross-sectional shape.

The sheaths may be designed in any shape capable of permitting the sheath to provide support to a seat back or seat pan when a bayonet from the seat back or seat pan is inserted into the sheath. Accordingly, in one embodiment, the sheath has solid walls around the periphery of the sheath. For example, if the sheath were rectangular or square, this embodiment would result in four solid walls such that the sheath would be closed and the entirety of the bayonet would be enclosed. In alternative embodiments, however, the sheath may include at least one partial wall such that the sheath is partially open. For example, again using a rectangular or square sheath, the sheath may include at least two partial walls and at least two solid walls. This would enable, for example, a sheath having two partial walls to have a cross-section resembling two "U" sections opposing one another. Alternatively, a sheath having three solid walls and one partial wall would result in a cross-section resembling a "C". The number of solid walls and/or partial walls in any sheath embodiment would be dependent on a number of factors including, but not limited to, the materials used to form the sheath, the materials used to form the bayonets, the shape of the bayonet, the shape of the sheath, or a combination thereof.

Since the sheaths are designed to provide structural support to the connection of the seat back and the seat pan in the universal seat of the present invention, it is beneficial for the sheaths to be constructed from a material stronger than the material used to form the seat back and the seat pan. Examples of materials that may be used to form the sheaths include, but are not limited to, steel, aluminum, magnesium, highly reinforced composites including carbon fiber, thermoplastic reinforced laminates, or a combination including at least one of the foregoing materials.

The sheaths may be formed using any method capable of forming a sheath from a higher strength material. For example, when the sheath is constructed from a metal material, the sheath may be formed using a method such as extrusion, roll forming, stamping, or die-casting. Alternatively, when the sheath is constructed from a composite material, the sheath may be formed from a method such as hand lay-up, injection/compression or compression molding.

The universal seats of the present invention may also include one or more additional features depending on the use and/or location of the universal seat. For example, as already discussed, in one embodiment, the universal seat may include a lumbar support attached to the seat back. The lumbar support may be integrally formed when the seat back is formed or may be attached at a later time. In an alternative embodiment, the universal seat may be designed such that the articulated recliner pivots, thereby enabling the seat pan to be rotated toward the seat back or vice versa. In these embodiments, the universal seat may include a latch or some other closing mechanism to enable the seat back and the seat pan to be securely connected to one another, such that the universal seat can be folded when not in use.

The foregoing and other features of the present invention will be more readily apparent from the following detailed description and drawings of the illustrative embodiments of the invention wherein like reference numbers refer to similar elements.

Referring to the drawings, FIG. 1 provides an exploded view of one embodiment of a universal seat 100. In this embodiment, the universal seat 100 includes a seat back 105, a seat pan 110, and two articulate recliners 115. The seat back includes two bayonets 120, each of which are capable of being inserted into a first sheath 125 of the articulated recliner 115. The seat back also includes two bayonets 130, each of which is capable of being inserted into a second sheath 135 of the articulated recliner 115. As may be seen in this embodiment, the sheaths 125, 135 and bayonets 120, 130 are rectangular in shape, although, as previously discussed, other shapes may be used. In addition, the sheaths 125, 135 are shown as a closed rectangular section. Lastly, the universal seat 100 includes a lumbar support 140 in the seat back 105 for providing support to the lumbar region of an individual sitting in the universal seat 100.

Figure 2:
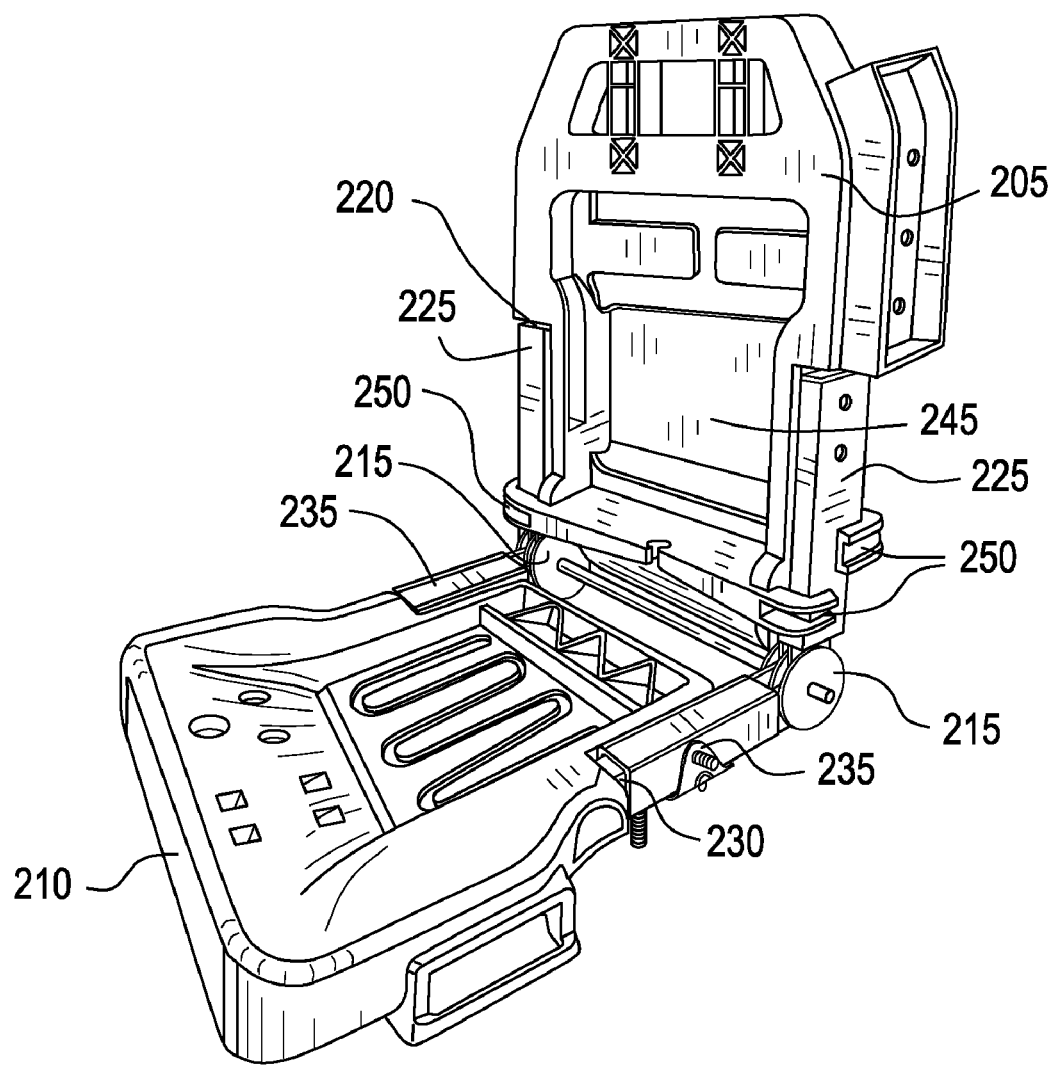
FIG. 2 is an perspective view of a universal seat according to an alternative embodiment of the present invention in an assembled condition.

FIG. 2 provides a perspective view of an alternative embodiment of a universal seat 200. In this embodiment, the universal seat 200 includes a seat back 205, a seat pan 210, and two articulate recliners 215. The seat back includes two bayonets (not shown), each of which are shown as being inserted into a first sheath 225 of the articulated recliner 215. The seat back also includes two bayonets (not shown), each of which is shown as being inserted into a second sheath 235 of the articulated recliner 215. In this embodiment, the bayonets 220, 230 (barely shown since the majority of the bayonets are inside the sheath) are rectangular in shape, although, as previously discussed, other shapes may be used. In addition, the sheaths 225, 235 are shown as being closed. In this embodiment, instead of a lumbar support, the universal seat includes a solid back portion 245. In addition, this embodiment includes additional support structures 250 in the form of "J"-shaped extensions that are integrally formed and separated on the seat back 205 and are shaped to be located on an exterior surface of each bayonet 220. These support structures 250 provide additional structural support to the seat back 205 (and/or the seat pan if formed with the seat pan) than provided with just the sheaths 225 and bayonets 220. It is understood that the function of this feature can be integrally formed with alternative geometries.

FIGS. 3A-3C provide an exploded view of an alternative embodiment of a universal seat 300. These Figures show just the seat back portion, although it is to be understood that the seat pan may include related structures. In this embodiment, the universal seat 300 includes a seat back 305, a seat pan (not shown), and two articulate recliners 315. The seat back includes two bayonets 320, each of which are capable of being inserted into a first sheath 325 of the articulated recliner 315. As with FIG. 1, the sheaths 325 and bayonets 320 are rectangular in shape and the sheaths 325 are shown as being closed. In this embodiment, there is no lumbar support or solid back portion. As with the embodiment shown in FIG. 2, this embodiment includes additional support structures 350 in the form of "C"-shaped extensions that are integrally formed with the seat back 305 and are shaped to be located on an exterior surface of each bayonet 320. These support structures 350 provide additional structural support to the seat back 305 (and/or the seat pan if formed with the seat pan) than provided with just the sheaths 325 and bayonets 320.

FIGS. 4A-4C provide an exploded view of still another alternative embodiment of a universal seat 400. These Figures again show just the seat back portion, although it is to be understood that the seat pan may include related structures. As with the previous embodiments, the universal seat 400 includes a seat back 405, a seat pan (not shown), and two articulate recliners 415. The seat back includes two bayonets 420, each of which are capable of being inserted into a first sheath 425 of the articulated recliner 415. Unlike the previous embodiments, though, the sheaths 425 are shown as being partially open. Despite being partially open, due to the material used to form the sheaths 425, the sheaths 425 still provide greater structural support than prior art seats using plastic sheaths. Also, as with some of the previous embodiments, this embodiment includes additional support structures 450 in the form of "C"-shaped extensions that are integrally formed with the seat back 405 and are shaped to be located on an exterior surface of each bayonet 420. These support structures 450 can be on the seat back 405, the seat pan, or both and provide more support that provided just with the sheaths 425 and bayonets 420.

It is to be understood that the concepts of the present invention may be used in any application in which one or more benefits of the present invention may be utilized. For example, while it is anticipated that the universal seats of the present invention may be utilized in motor vehicles, it is to be understood that the universal seats of the present invention may be formed such that they are portable, thereby enabling the universal seat to be carried by an individual, such as to a sporting event or any other location wherein temporary seating may be beneficial.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A universal seat comprising:
   a seat back having at least one bayonet;
   a seat pan having at least one bayonet; and
   an articulated recliner having at least two sheaths;
   wherein the at least one seat back bayonet is inserted into one sheath of the articulated recliner and the at least one seat pan bayonet is inserted into the other sheath of the articulated recliner;
   wherein the seat back and the seat pan each comprise a thermoplastic material.

2. The universal seat of claim 1, wherein the seat back and the seat pan each comprise the same thermoplastic material.

3. The universal seat of claim 1, wherein the seat back and the seat pan each comprise different thermoplastic materials.

4. The universal seat of claim 1, wherein the seat back, the seat pan, or both comprise a thermoplastic material selected from polycarbonate/ABS blend, blends of polyphenylene oxide and polystyrene, blends of polyphenylene ether/polyamide, blends of polycarbonate/polyethylene terephthalate (PET)/polybutylene terephthalate (PBT), PBT and impact modifier, a long fiber reinforced thermoplastic, or a combination including at least one of the foregoing materials.

5. The universal seat of claim 1, wherein the seat back comprises a material selected from glass-fiber reinforced PBT or a long fiber-reinforced polyamide.

6. The universal seat of claim 1, wherein the seat pan comprises a material selected from a polycarbonate, a polybutylene terephthalate, a PC/PBT blend with an impact modifier, or a combination of one or more of the foregoing.

7. The universal seat of claim 1, wherein the articulated recliner comprises a material selected from steel, aluminum, magnesium, highly reinforced composites, thermoplastic reinforced laminates, or a combination including at least one of the foregoing materials.

8. The universal seat of claim 1, wherein the at least one seat back bayonet, the at least one seat pan bayonet, or both are solid.

9. The universal seat of claim 1, further comprising a lumbar support attached to the seat back.

10. The universal seat of claim 1, wherein the articulated recliner includes at least one sheath that is closed.

11. The universal seat of claim 1, wherein the articulated recliner includes at least one sheath that is partially open.

12. The universal seat of claim 1, wherein the seat pan includes structural segments that are fixed to a rail on a vehicle floor to secure the seat pan.

13. The universal seat of claim 1, wherein the seat pan includes structural segments that are fixed directly to a vehicle floor.

14. The universal seat of claim 1, further comprising at least one secondary support structure located on the seat back, the seat pan, or both, wherein the at least one secondary support structure comprises a "J"-shaped extension integrally formed with the seat back, the seat pan, or both and designed to surround at least a portion of the articulated recliner sheath.

* * * * *